(12) United States Patent
Monasterial

(10) Patent No.: US 11,857,123 B2
(45) Date of Patent: Jan. 2, 2024

(54) DISPOSABLE PORTABLE TOILET SYSTEM

(71) Applicant: Michael Monasterial, Kingston, NY (US)

(72) Inventor: Michael Monasterial, Kingston, NY (US)

( * ) Notice: Subject to any disclaimer, the term of this patent is extended or adjusted under 35 U.S.C. 154(b) by 0 days.

(21) Appl. No.: 17/702,019

(22) Filed: Mar. 23, 2022

(65) Prior Publication Data
US 2022/0313032 A1 Oct. 6, 2022

Related U.S. Application Data

(60) Provisional application No. 63/169,469, filed on Apr. 1, 2021.

(51) Int. Cl.
*A47K 11/03* (2006.01)

(52) U.S. Cl.
CPC .................................. *A47K 11/035* (2013.01)

(58) Field of Classification Search
CPC .............................. A47K 11/035; Y02A 50/30
USPC ................................................. 4/300, 300.1, 2
See application file for complete search history.

(56) References Cited

U.S. PATENT DOCUMENTS

| | | | | |
|---|---|---|---|---|
| 3,624,665 A * | 11/1971 | Klingle, Sr. | ......... | A47K 11/035 4/321 |
| 4,850,064 A * | 7/1989 | Cameron | ................ | E03D 5/01 4/321 |
| 5,950,251 A * | 9/1999 | Cost | ................ | A47K 13/00 248/101 |
| 6,047,414 A * | 4/2000 | Bailey | ................ | A47K 11/02 4/484 |
| 6,079,058 A * | 6/2000 | Green | ................ | A47K 11/045 4/479 |
| 6,189,162 B1 * | 2/2001 | Tanner | ................ | A61G 9/00 4/452 |
| 6,240,576 B1 * | 6/2001 | Cosby | ................ | A47K 11/02 4/476 |
| 6,317,900 B1 * | 11/2001 | Braxton | ................ | A47K 11/02 4/483 |
| 7,103,926 B1 * | 9/2006 | Rasberry | ................ | A47K 11/02 4/483 |
| 8,499,370 B1 * | 8/2013 | Felicetta | ................ | A47K 11/04 4/479 |
| 11,627,847 B2 * | 4/2023 | Nyankira | ................ | A47K 11/04 4/483 |

(Continued)

FOREIGN PATENT DOCUMENTS

WO    WO-2017077430 A1 *  5/2017

*Primary Examiner* — Lori L Baker
(74) *Attorney, Agent, or Firm* — Brennan, Manna & Diamond, LLC

(57) ABSTRACT

A disposable portable toilet system for safely retaining and disposing human waste. The disposable portable toilet system is configured to receive human waste, then dry, sanitize, and deodorize it for disposal. A waste collection component includes an outer shell with an inner liner. The waste collection component is open at the top to create a waste collection area within. A hinged lid can seal the top after use. A chemical component is positioned within the waste collection area to neutralize and solidify the waste. A u-shaped seat component fits around the waste collection component to create a seating area for use. Once used, the waste collection component is sealed within a biodegradable bag for disposal.

19 Claims, 10 Drawing Sheets

(56) References Cited

U.S. PATENT DOCUMENTS

| | | | | |
|---|---|---|---|---|
| 2004/0199986 A1* | 10/2004 | Bernsley | ............... | A47K 13/06 4/237 |
| 2007/0022523 A1* | 2/2007 | Smithson | ............... | A47K 11/04 4/484 |
| 2007/0107116 A1* | 5/2007 | Zamberlan | ............ | A47K 11/06 4/484 |
| 2008/0022445 A1* | 1/2008 | Sell | ....................... | A47K 11/06 4/484 |
| 2008/0263757 A1* | 10/2008 | Samuels | ............. | A47K 11/105 4/239 |
| 2009/0044325 A1* | 2/2009 | Sell | ....................... | A47K 11/06 4/144.2 |
| 2013/0212796 A1* | 8/2013 | Morris | .................. | A47K 11/06 4/484 |
| 2015/0182402 A1* | 7/2015 | Nelson | ................ | A61G 7/1007 4/479 |
| 2016/0375291 A1* | 12/2016 | Mullowney, Jr. | ..... | B09B 3/0075 588/315 |
| 2017/0027396 A1* | 2/2017 | Hibbs | ................... | A47K 17/00 |
| 2020/0085263 A1* | 3/2020 | Hibbs | ................... | B01F 31/55 |

* cited by examiner

DISPOSABLE PORTABLE TOILET SYSTEM

CROSS-REFERENCE TO RELATED APPLICATION

The present application claims priority to, and the benefit of, U.S. Provisional Application No. 63/169,469, which was filed on Apr. 1, 2021 and is incorporated herein by reference in its entirety.

FIELD OF THE INVENTION

The present invention generally relates to a portable toilet, and more specifically to a disposable portable toilet system for safely retaining, neutralizing, and disposing human waste. Accordingly, the present specification makes specific reference thereto. However, it is to be appreciated that aspects of the present invention are also equally amenable to other like applications, devices, and methods of manufacture.

BACKGROUND

Many parents avoid taking their children in the car and out for daily errands for fear that they will need to expose their children to an unsanitary public restroom. Road trips can be especially stressful because it is inevitable that different family members will need to use a public restroom throughout the trip. Often even locating a restroom while on a long car ride can be difficult. For individuals that suffer from incontinence, it can also be stressful to be out of the house without a private and accessible bathroom. Campers must make special provisions for restroom access when traveling in remote location. There are many situations where having a portable and hygienic bathroom option in a vehicle would be beneficial.

A portable or mobile toilet is any type of toilet that can be moved around. Most types do not require any pre-existing services or infrastructure, such as sewerage, but are completely self-contained. Larger portable toilets are not very portable, requiring machinery to relocate which is not practical for a traveler. A bucket toilet or camping toilet is a basic form of a dry toilet whereby a bucket or pail is used to collect excreta. Usually, feces and urine are collected together in the same bucket, leading to odor and sanitary issues. The bucket toilet may be situated used in a dwelling, a tent, a vehicle, or even out in the open. The bucket toilet may employ a liner, so that waste may be removed with each use or when the toilet is filled.

Accordingly, there is a great need for a convenient alternative to pulling over frequently to locate a clean restroom. There is also a need for a way for a system to afford peace of mind to individuals with incontinence that a hygienic and private bathroom option is always accessible to them when needed. Similarly, there is a need for a portable toilet system that improves road trips and day to day car rides by offering a clean bathroom in the privacy of one's own vehicle for use by children and adults. There is also a need for a way to eliminate the need for outdoor enthusiasts and campers to make a special provision for using the restroom in remote areas. Further, there is a need for a portable lavatory system for any vehicle that effectively receives human waste, dries it, sanitizes it, and deodorizes it for disposal.

In this manner, the improved disposable portable toilet system of the present invention accomplishes all of the forgoing objectives, thereby providing an easy solution for carrying out bodily functions on the go. A primary feature of the present invention is a hygienic and private bathroom option that is always accessible when needed The present invention provides a clean toilet solution in the privacy of one's own vehicle Finally, the improved disposable portable toilet system of the present invention is capable of providing a portable lavatory system that effectively receives human waste, dries it, sanitizes it, and deodorizes it for disposal.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a disposable portable toilet system. The disposable portable toilet system is constructed with a combination of disposable and reusable components. The disposable components are biodegradable in construction. The system collects and converts human excreta into inert non-biohazard material for easy disposal.

The disposable portable toilet system comprises a waste collection component, a chemical component, and a seat component. The waste collection component is constructed from biodegradable materials. The waste collection component comprises an outer shell, an inner liner, and a waste collection area. The outer shell is configured in a generally rectangular shape that is open at the top. The inner liner forms a water-proof layer that coats an inside of the outer shell and defines the waste collection area. The waste collection component further comprises a hinged lid that is attachable to the outer shell at one end. The hinged lid is configured to act as a privacy shield when open and covers the open top of the outer shell when closed effectively sealing the waste collection container.

The chemical component is positional within the waste collection area. The chemical component is formulated to sanitize, solidify, and absorb human excreta. The chemical component comprises a sanitizing agent, a solidifying agent, and an absorbent. A mixture of the sanitizing agent, solidifying agent, and absorbent is retained in a water soluble pouch.

The water soluble pouch is positional within the waste collection area of the waste collection component. The water soluble pouch is constructed to release the retained chemical component when the waste collection component is shaken. Once released, the chemical component interacts with the human excreta to convert it into safe non-biohazard material for traditional disposal.

The seat component is configured to partially surround the waste collection component. The seat component is reusable and is constructed to support the weight of a user. The seat component comprises a back and a pair of legs configured substantially in a u-shape and is configured to accept and retain the waste collection component between the pair of legs abutting the back. The seat component is removable and separable from the waste collection component when not in use.

To use the disposable portable toilet system, the user slides the waste collection component into the seat component. The lid of the waste collection component is lifted for privacy. Once used, the lid is closed to seal the excreta within the waste collection area. The seat component may then be removed for reuse. Next, the user shakes the sealed waste collection component to breach the water soluble pouch releasing the chemical component to neutralize the excreta. Finally, the entire waste collection component is disposed of without the need for further treatment of the excreta.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
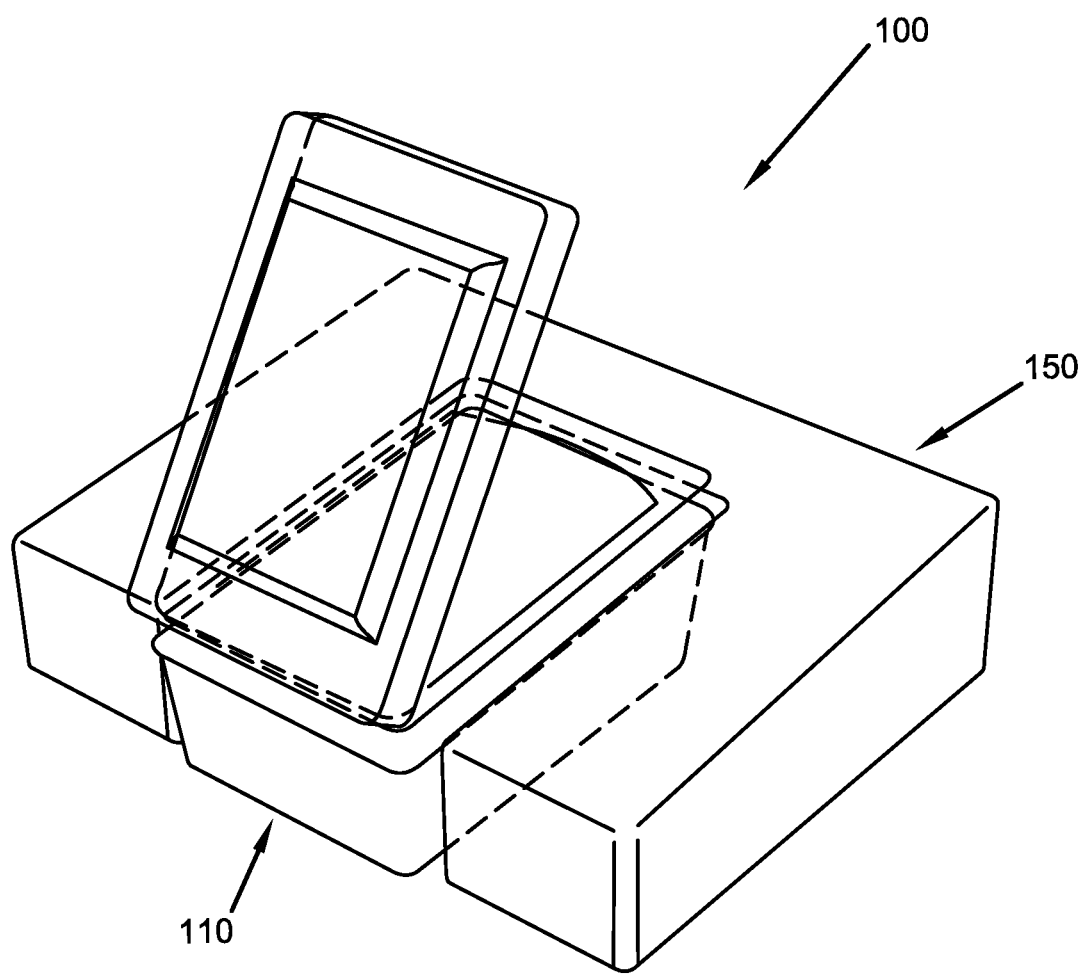
FIG. 1 illustrates a perspective view of a disposable portable toilet system of the present invention for safely retaining and disposing human waste in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a portable disposable toilet system designed for use in a vehicle to provide a hygienic and safe environment for occupants to use the restroom while on the go. The invention is comprised of an outer shell of lightweight cardboard that includes a wax liner to keep a liquid product from leaking. It is a one use product with an approximately 20-24 ounce maximum fill of liquid or solid waste limit. The top of the box pulls open and when the top is popped open the front part becomes a guard for an individual's genitals and also helps in the aiming process. There is a limit line for each box that is clearly marked. Inside the box are chemicals designed to be organic, sustainable, absorbent, sanitizing, and deodorizing. The chemicals pull water out of the waste making it inert and a non-biohazard material that can be disposed of in any garbage receptacle. It can also be buried if needed.

Once the user has relieved themselves, wiped, and placed the wiping material into the box, the box is shaken vigorously for five seconds to contain and mix the contents. The box is sealed so that it will not leak and will not smell. The box then goes into a biodegradable plastic bag, and the bag is sealed for disposal in a garbage receptacle. The system comes with four large wax lined paper sheets. It also comes with a booster seat system as part of the kit. There are lightweight, weight bearing U-shaped rings. Different sized rings can be used for different sized individuals. They are generally rectangular in shape and lightweight.

The portable disposable toilet system is a waterless, odorless, germ free, contact free system that allows for privacy and portability. The system is user friendly and does not expire prior to use. The portable disposable toilet system typically holds up to 24 ounces of human waste (liquid or solid) at one time.

Referring initially to the drawings, FIGS. 1-10 illustrate a disposable portable toilet system 100. As illustrated in FIG. 1, the disposable portable toilet system 100 is constructed with a combination of disposable and reusable components. The disposable components are biodegradable in construction. The disposable portable toilet system 100 is designed to safely collect and convert human excreta into inert non-biohazard material for safe and easy disposal.

Figure 2:
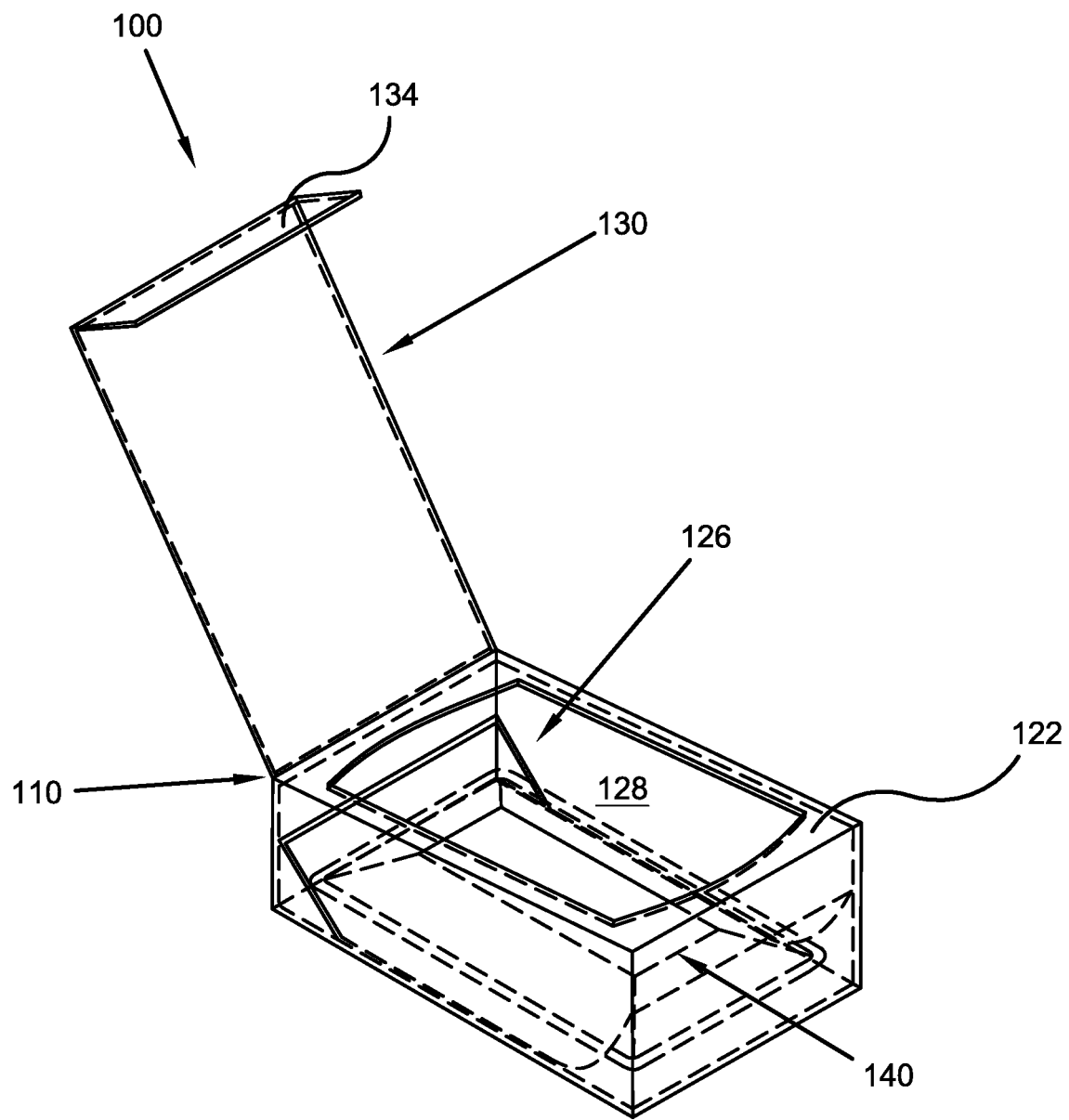
FIG. 2 illustrates a perspective view of a waste collection component and a chemical component of the disposable portable toilet system of the present invention for safely retaining and disposing human waste in accordance with the disclosed architecture.
Figure 3:
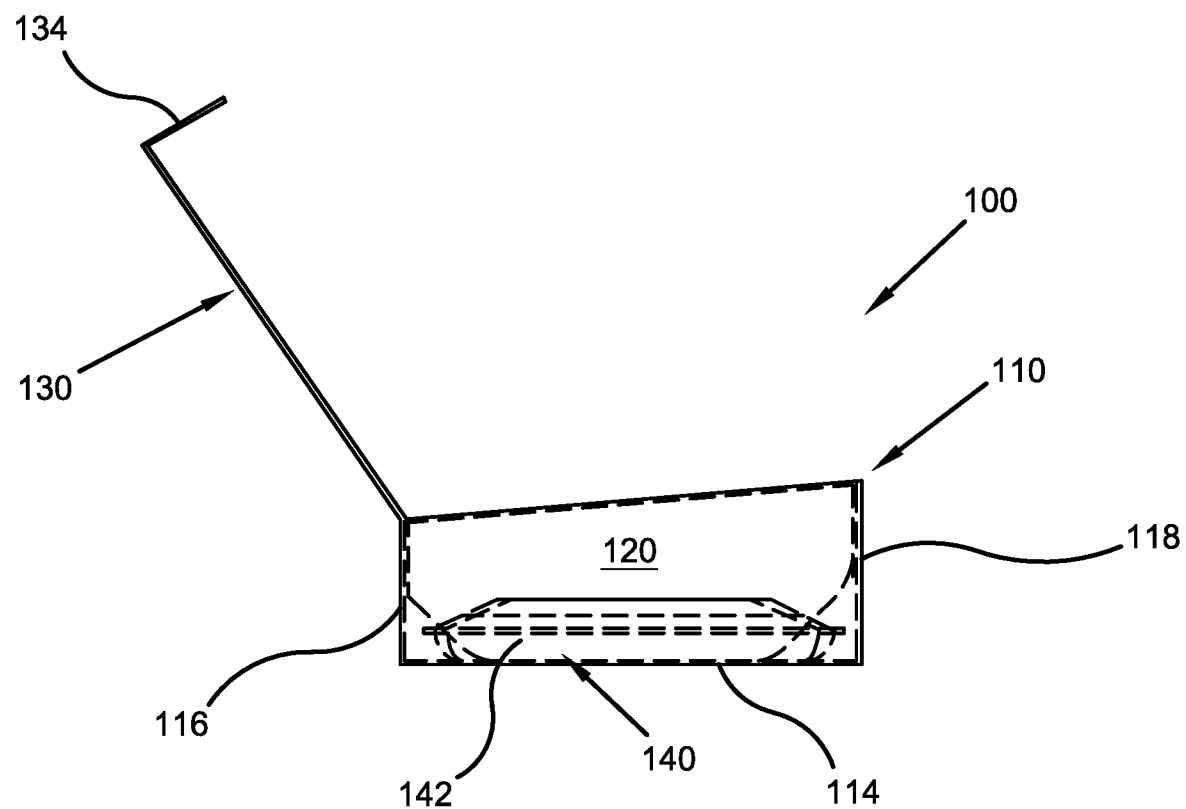
FIG. 3 illustrates a side view of the waste collection component and the chemical component of the disposable portable toilet system of the present invention for safely retaining and disposing human waste in accordance with the disclosed architecture.
Figure 4:
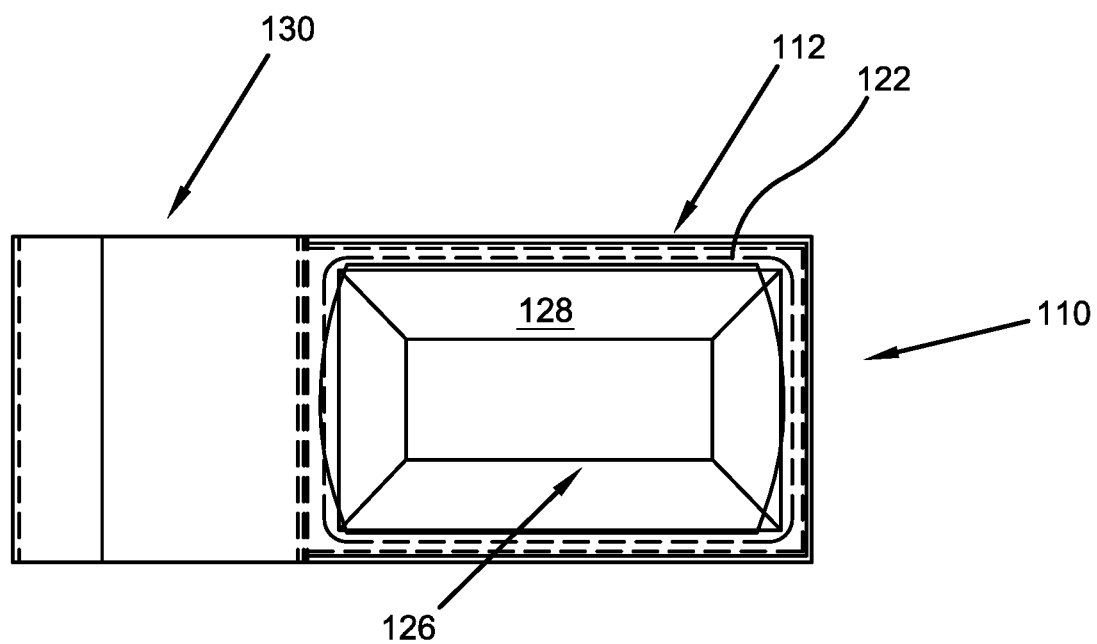
FIG. 4 illustrates an overhead view of the waste collection component of the disposable portable toilet system of the present invention for safely retaining and disposing human waste in accordance with the disclosed architecture.
Figure 5:
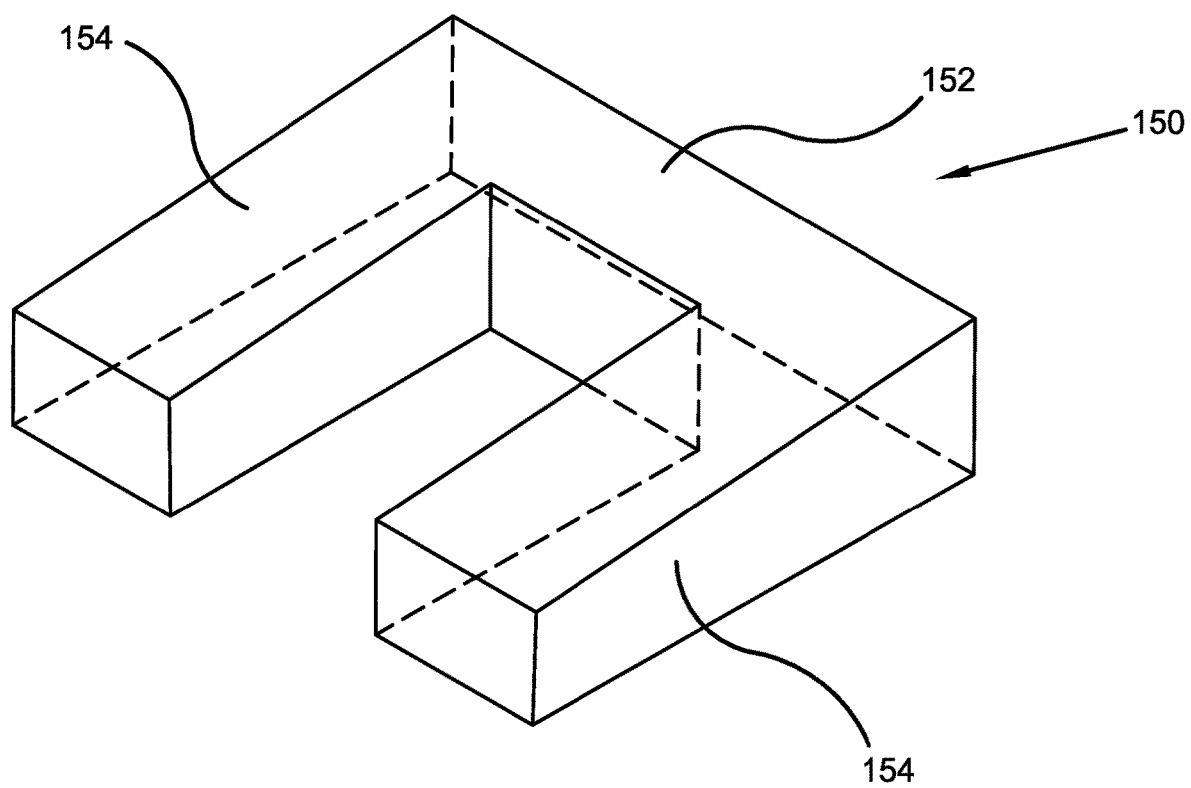
FIG. 5 illustrates a perspective view of a seat component of the disposable portable toilet system of the present invention for safely retaining and disposing human waste in accordance with the disclosed architecture.
Figure 6:
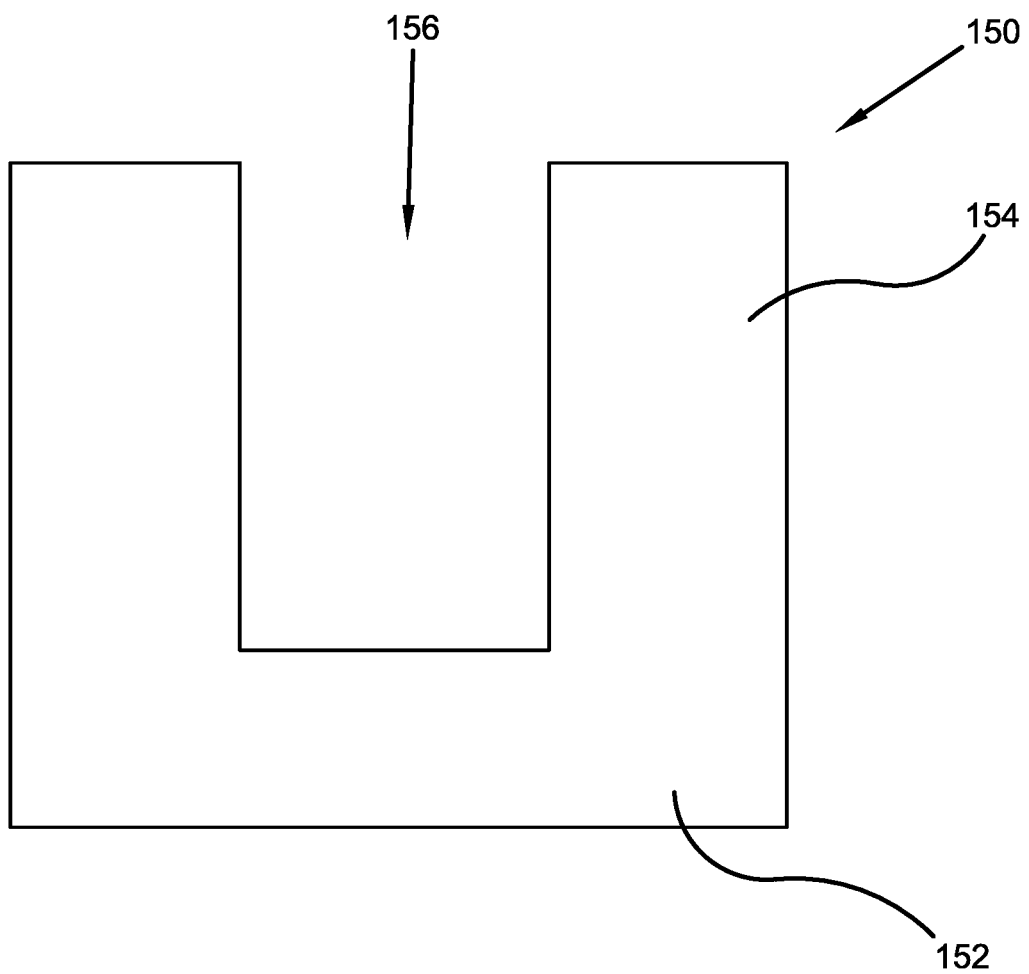
FIG. 6 illustrates an overhead view of the seat component of the disposable portable toilet system of the present invention for safely retaining and disposing human waste in accordance with the disclosed architecture.
Figure 7:
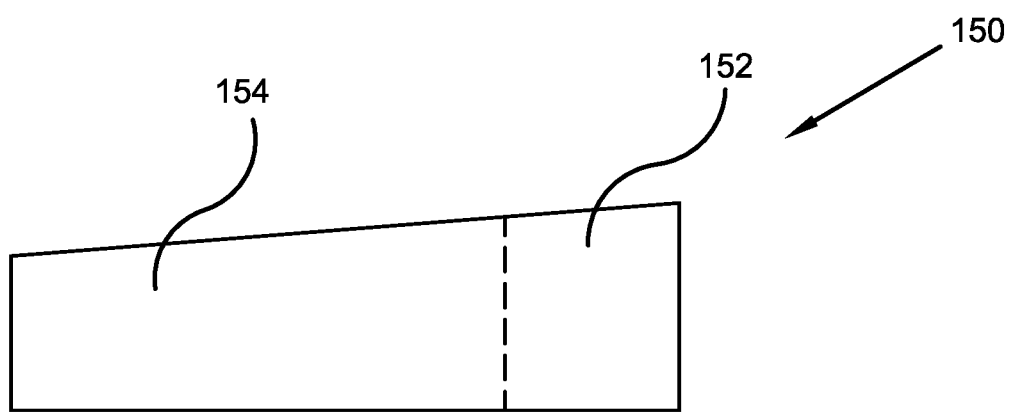
FIG. 7 illustrates a side view of the seat component of the disposable portable toilet system of the present invention for safely retaining and disposing human waste in accordance with the disclosed architecture.
Figure 8:
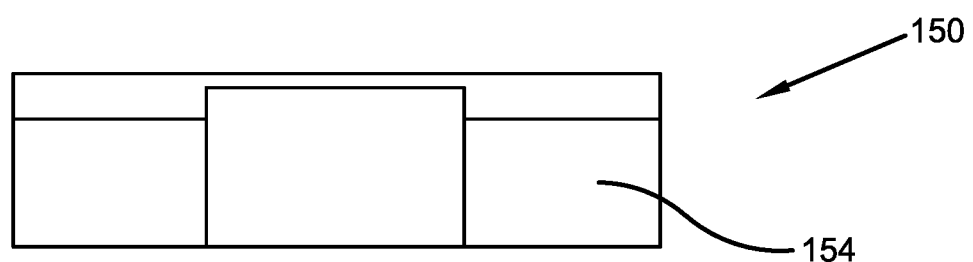
FIG. 8 illustrates an end view of the seat component of the disposable portable toilet system of the present invention for safely retaining and disposing human waste in accordance with the disclosed architecture.

The disposable portable toilet system 100 comprises a waste collection component 110, a chemical component 140, and a seat component 150. The waste collection component 110 is typically constructed from biodegradable materials. As illustrated in FIGS. 2-4, the waste collection component 110 comprises an outer shell 112, an inner liner 128, and a waste collection area 126. The outer shell 110 is configured in a generally rectangular shape that is open at the top. The outer shell 110 may be manufactured from recycled cardboard or similar rigid biodegradable material.

The outer shell 110 comprises a base 114, a front end wall 116, a back end wall 118, and a pair of sidewalls 120 connecting the front and back end walls 116 and 118. The back end wall 118 is taller than the front end wall 116. The pair of side walls 120 are sloped from front to back at the top. In one embodiment, the pair of side walls 120 are sloped approximately five degrees downward from front to back. The outer shell 110 is open at the top. The outer shell 110 further comprises a top rim 122. The top rim 122 extends around the open top of the outer shell 110. The opening may be shaped similar to the opening in a traditional bed pan or may be of any geometric configuration. The top rim 122 may comprise a gasket or similar sealing element (not shown).

The inner liner 128 forms a water-proof layer that coats an inside of the outer shell 110 and defines the waste collection area 126 within. The inner liner 128 may be manufactured from an organic wax or similar water-proof material. A fill line (not shown) may be formed or added to the inner liner 128 to indicate a capacity of the waste collection area 126.

The waste collection component 110 further comprises a hinged lid 130. The hinged lid 130 comprises a lid liner 132 and a front lip 134. The lid liner 132 may be manufactured from the organic wax or similar water-proof material used for the inner liner 128 of the waste collection component 110. The hinged lid 130 is attachable to the front end wall 116 of the outer shell 112. The hinged lid 130 opens upward and away from the waste collection area 126 to act as a privacy shield and barrier when open. The hinged lid 130 covers the open top of the outer shell 112 when closed effectively sealing the waste collection container 110. The hinged lid 130 may comprise a sealing element or gasket (not shown) to engage the top rim 122 of the outer shell 112 to form a water-tight seal. The front lip 134 engages the front end wall 116 and may be secured with a fastening mechanism or adhesive.

The chemical component 140 is positional within the waste collection area 126 of the waste collection component 110 prior to use. The chemical component 130 is formulated to sanitize, solidify, and absorb human excreta deposited within the waste collection area 126. The chemical component 140 comprises a sanitizing agent, a solidifying agent, and an absorbent. A mixture of the sanitizing agent, solidifying agent, and absorbent is retained in a water soluble pouch 142.

The sanitizing agent is typically a salt based sanitizing agent. One preferred composition of the sanitizing agent is a metal oxide mixture of sodium, potassium, calcium, aluminum, iron, and silicon elements. One preferred formulation of the sanitizing agent is 53.04% sodium, 23.2% potassium, 11.8% calcium, 6.64% aluminum, 3.81% iron, and 2.51% silicon 2.51%. The sanitizing agent is formulated to sanitize the excreta.

The solidifying agent is a mixture of calcium, silica, alumina, and iron. One preferred formulation of the solidifying agent is a Portland cement comprising a mixture of approximately 67.54% tricalcium silicate (Ca3SiO5), 28.13% dicalcium silicate (Ca2SiO4), 3.11% tricalcium aluminate (Ca3Al2O5), and 1.2% calcium aluminoferrite (Ca4AInFe2-nO7). The calcium is typically derived from limestone, marl, or chalk, while silica, alumina and iron come from the sands, clays and iron ore sources. The solidifying agent is formulated to remove water from and solidify liquid excreta.

The absorbent is typically an organic biodegradable litter derived from plant material. Biodegradable litters are typically made from various plant resources, including pine wood pellets, recycled newspaper, clumping sawdust, Brazilian cassava, corn, wheat, walnuts, barley, soy pulp and dried orange peel. The biodegradable litter may be a cat litter. The absorbent is formulated to remove water from and solidify liquid excreta.

In one embodiment, the chemical component is formulated with a ratio of one part of the sanitizing agent, one part of the solidifying agent, and four parts of the absorbent. By weight, the chemical component may be approximately 28.35 grams (salt based sanitizing agent, approximately 28.35 grams (solidifying agent), and approximately 113.4 grams (absorbent). In one example, the chemical component may be approximately six ounces and formulated as follows: one ounce of Smelleze® Blood and waste sanitizer absorbent (salt based sanitizing agent), one ounce of Portland Lyme (solidifying agent), and four ounces of organic Kitty litter. This is not meant as a limitation as a ratio of the formulation components may vary depending on the needs of the user.

The water soluble pouch 142 is positional within the waste collection area 126 of the waste collection component 110. The water soluble pouch 142 is constructed to release the retained chemical component 140 when the waste collection component 110 is shaken. Once released, the chemical component 140 interacts with the human excreta to convert it into safe non-biohazard material for traditional disposal.

As illustrated in FIGS. 5-8, the seat component 150 is configured to partially surround the waste collection component 110. The seat component 150 is reusable and is constructed to support the weight of a user and function as a seat. The seat component 150 may be constructed from, a plastic, a compressed foam-degradable cardboard, a honeycomb form molded pulp, or a similar more durable material.

The seat component 150 comprises a back 152 and a pair of legs 154. The seat component 150 is substantially u-shaped and is configured to accept and retain the waste collection component 110 in a waste collection component receiving area 156 between the pair of legs 154 and abutting the back 152. The seat component 150 is removable and separable from the waste collection component 110 when not in use. The seat component 150 is sloped approximately five degrees downward from front to back. This is advantageous as it matches the slope for most vehicle seats and the slope of the waste collection component 110. When in place, the back end wall 118 of the waste collection component 110 abuts the back 152 of the seat component 150 and the pair of sidewalls 120 abut an inside of each of the respective pair of legs 154.

Figure 9:
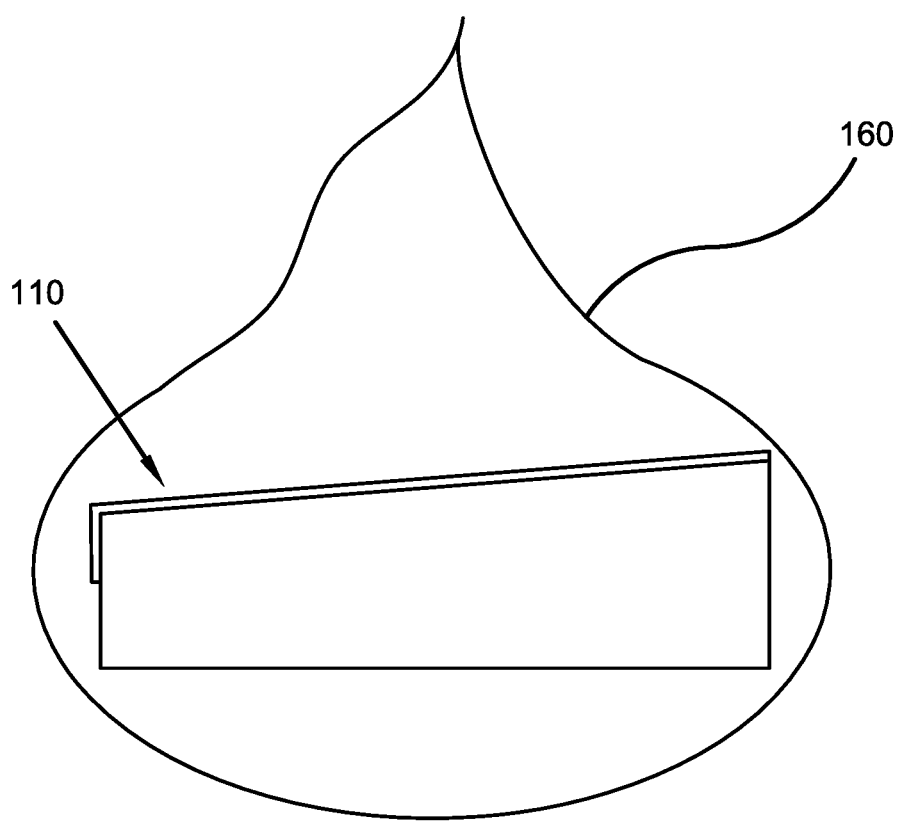
FIG. 9 illustrates a perspective view of the waste collection component sealed in a disposal bag of the disposable portable toilet system of the present invention for safely retaining and disposing human waste in accordance with the disclosed architecture.

As illustrated in FIG. 9, the disposal portable toilet system 100 may further comprise a biodegradable disposal bag 160. The biodegradable disposal bag 160 is configured to retaining the waste collection component 110 once used and sealed with the hinged lid 130. The waste collection component 110 is removed from the seat component 150 and placed within the biodegradable disposal bag 160. The biodegradable disposal bag 160 is then sealed to encapsulate the waste collection component 110 for further disposal.

Figure 10:
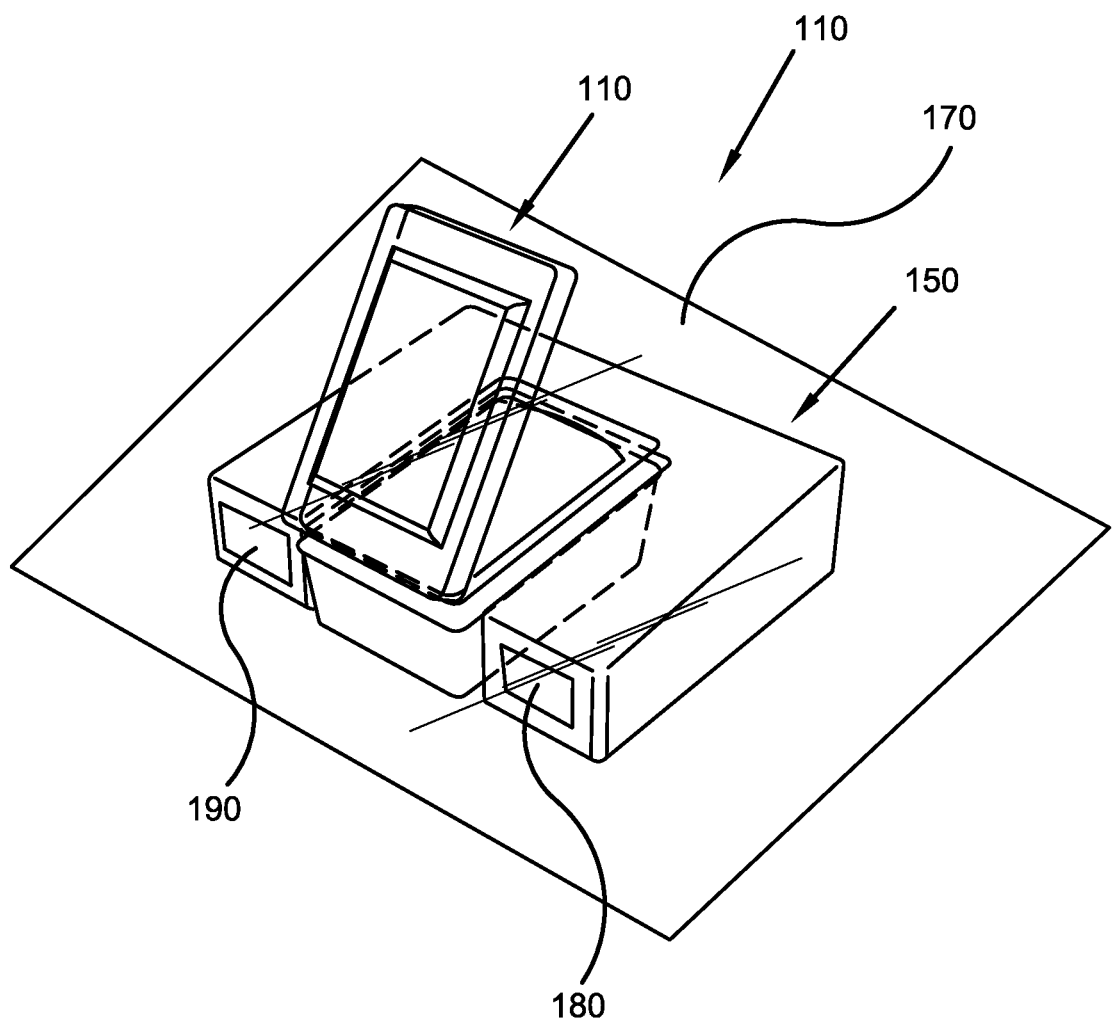
FIG. 10 illustrates a perspective view of the disposable portable toilet system of the present invention for safely retaining and disposing human waste in accordance with the disclosed architecture.

As illustrated in FIG. 10, the disposal portable toilet system 100 may further comprise a plurality of water-proof sheet barriers 170. The water-proof sheet barriers 170 may be plastic lined large sheets that are opaque for privacy. The water-proof sheet barriers 170 are reusable and may be used to drape the user or be positioned under the waste collection component 110 and the reusable u-shaped seat component 150 to protect an interior of a vehicle.

The disposal portable toilet system 100 may further comprise a plurality of a plurality of disposable wipes 180.

The disposable wipes 180 may be sheets of bamboo paper or similar water soluble paper film for wiping the person's body parts. The disposable wipes 180 may positioned in a pouch or pocket attachable to the waste collection component 110 or the seat component 150. The disposal portable toilet system 100 may further comprise a personal sanitizing agent 190. The personal sanitizing agent 190 may be a hand sanitizer liquid or wipes positioned in a pocket attachable to the waste collection component 110 or the seat component 150.

To use the disposable portable toilet system 100, the user slides the waste collection component 110 into the waste collection component retaining area 156 of the seat component 150. The lid 130 of the waste collection component 110 is lifted for privacy. Once used, the lid 130 and the front lip 134 is closed to seal the excreta within the waste collection area 126. The seat component 150 may then be removed for reuse. Next, the user shakes the sealed waste collection component 110 to breach the water soluble pouch 142 releasing the chemical component 140 to mix with and neutralize the excreta for approximately five to ten seconds. Finally, the entire waste collection component 110 is placed in the biodegradable disposable bag 160 and disposed of without the need for further treatment of the excreta. As the waste is solid and sanitized, the waste collection component 110 can be disposed of in any trash receptacle as it is illegal to throw untreated human waste into a trash container.

Notwithstanding the forgoing, the disposable portable toilet system 100 can be any suitable size, shape, and configuration as is known in the art without affecting the overall concept of the invention, provided that it accomplishes the above stated objectives. One of ordinary skill in the art will appreciate that the shape and size of the disposable portable toilet system 100 and its various components, as show in the FIGS. are for illustrative purposes only, and that many other shapes and sizes of the disposable portable toilet system 100 are well within the scope of the present disclosure. Although dimensions of the disposable portable toilet system 100 and its components (i.e., length, width, and height) are important design parameters for good performance, the disposable portable toilet system 100 and its various components may be any shape or size that ensures optimal performance during use and/or that suits user need and/or preference. As such, the disposable portable toilet system 100 may be comprised of sizing/shaping that is appropriate and specific in regard to whatever the disposable portable toilet system 100 is designed to be applied.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A disposable portable toilet system comprising:
a waste collection component comprising a waste collection area and a hinged lid;
a chemical component positional within the waste collection area, the chemical component formulated to sanitize, solidify, and absorb human excreta; and
a seat component configured to partially surround the waste collection component; and
wherein seat component is separable from the waste collection component.

2. The disposable portable toilet system of claim 1, wherein the waste collection component is biodegradable.

3. The disposable portable toilet system of claim 1, wherein the waste collection component further comprises an outer shell and a water-proof inner liner.

4. The disposable portable toilet system of claim 1, wherein the chemical component comprises a sanitizing agent, a mixture of calcium, silica, alumina, and iron, and Portland cement.

5. The disposable portable toilet system of claim 1, wherein the chemical component is retained in a water soluble pouch.

6. The disposable portable toilet system of claim 1, wherein the seat component is u-shaped.

7. The disposable portable toilet system of claim 1, wherein the seat component is sloped five degrees downward from back to front.

8. The disposable portable toilet system of claim 1, wherein the seat component is reusable.

9. A disposable portable toilet system comprising:
a waste collection component comprising a waste collection area;
a chemical component formulated to sanitize, solidify, and absorb human excreta and retained in a water soluble pouch positional within the waste collection area; and
a reusable u-shaped seat component configured to partially surround the waste collection component; and
wherein seat component is separable from the waste collection component.

10. The disposable portable toilet system of claim 9, wherein the water soluble pouch is configured to release the chemical component when shaken.

11. The disposable portable toilet system of claim 9, wherein the chemical component is formulated with a ratio of one part of a sanitizing agent, one part of a mixture of calcium, silica, alumina, and iron, and four parts of Portland cement.

12. The disposable portable toilet system of claim 9, wherein the sanitizing agent is a salt based sanitizing agent.

13. The disposable portable toilet system of claim 12, wherein the salt based sanitizing agent is a mixture of sodium, potassium, calcium, aluminum, iron, and silicon.

14. The disposable portable toilet system of claim 9, wherein the chemical component comprises a mixture of calcium, silica, alumina, and iron.

15. The disposable portable toilet system of claim 9, wherein the chemical component comprises Portland cement.

16. The disposable portable toilet system of claim 9, wherein the chemical component comprises a biodegradable litter derived from a plant material.

17. A disposable portable toilet system comprising:
a waste collection component comprising outer shell open at the top, a water-proof inner liner defining a waste collection area, and a hinged lid;
a chemical component formulated to sanitize, solidify, and absorb human excreta and retained in a water soluble pouch positional within the waste collection area;

a reusable u-shaped seat component configured to partially surround the waste collection component;
a biodegradable disposal bag for retaining the waste collection component once used;
a plurality of disposable wipes; and
wherein seat component is separable from the waste collection component.

18. The disposable portable toilet system of claim 17 further comprising at least one water-proof sheet barrier positional under the waste collection component and the reusable u-shaped seat component.

19. The disposable portable toilet system of claim 17, wherein the chemical component is formulated with a ratio of one part of a salt based sanitizing agent, one part of a mixture of sodium, potassium, calcium, aluminum, iron, and silicon, and four parts of Portland cement.

\* \* \* \* \*